July 14, 1925.

G. CATTANEO

ELASTIC DOUBLE COUPLING FOR POWER TRANSMISSION

Filed July 10, 1923    2 Sheets-Sheet 1

1,545,548

Inventor
G. Cattaneo
By Marks & Clerk
Attys.

Inventor
G. Cattaneo
By Marks & Clerk
Attys.

Patented July 14, 1925.

1,545,548

UNITED STATES PATENT OFFICE.

GIUSTINO CATTANEO, OF MILAN, ITALY.

ELASTIC DOUBLE COUPLING FOR POWER TRANSMISSION.

Application filed July 10, 1923. Serial No. 650,713.

*To all whom it may concern:*

Be it known that I, GIUSTINO CATTANEO, subject of the King of Italy, residing at 79 Via Monterosa, Milan, in the Kingdom of Italy, have invented a new and useful Elastic Double Coupling for Power Transmissions, of which the following is a specification.

The elastic double coupling forming the object of the present invention aims at damping the vibrations between a driving organ of the transmission and a driven organ coaxial thereto. The main field of application thereof is to be found in the driving gear for the distribution of internal combustion engines, where it is necessary to damp the vibrations which would otherwise be transmitted to the distribution by the shaft by which it is driven.—

The annexed drawing illustrates by way of example one method of actuating the invention.

On the driving shaft —a— is rigidly fixed through the key —h— the sleeve —b— fitted at one end with the toothed rim —c—.

On the sleeve —b— is fitted a further sleeve —d— which can freely revolve on —b— through an intermediate of the bush —e—, but cannot slide axially, being prevented therefrom by the toothed rim —c— at one end and by the driving shaft —a— at the other end.—

The sleeve —d— carries at one end the gear wheel —f— operating the distribution; at its other end it is fitted with the toothed rim —g— which is identical to the toothed rim —c— and similarly arranged.—

A ring —i— having double T-section peripherally surrounds both rims —c— and —d— and is laterally held between two discs —l— and —l₁— that are secured together by bolts —m—. On these bolts are pivotally mounted two sets of pawls, namely, the pawls —n— engaging the teeth of rim —c— and the pawls —n'— engaging the teeth of rim —g—.—

Figure 1:
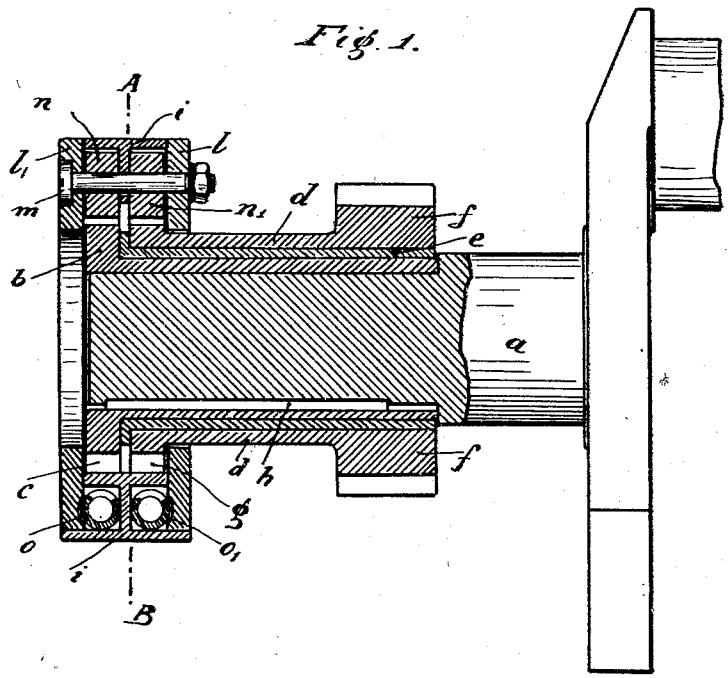
Fig. 1 is a longitudinal section showing one method of application of the novel arrangement.
Figure 3:
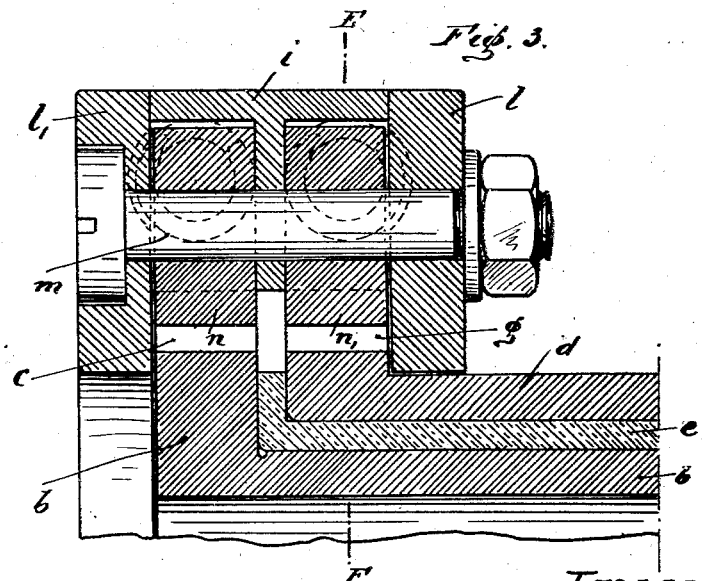
Fig. 3 is a partial longitudinal section to a larger scale.
Figure 2:
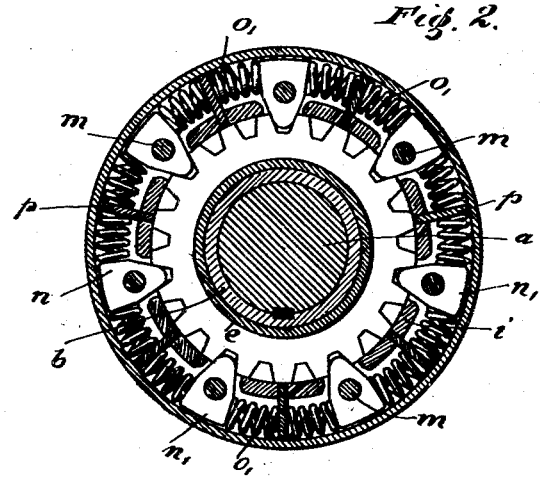
Fig. 2 is a cross section through A—B in Fig. 1.
Figure 4:
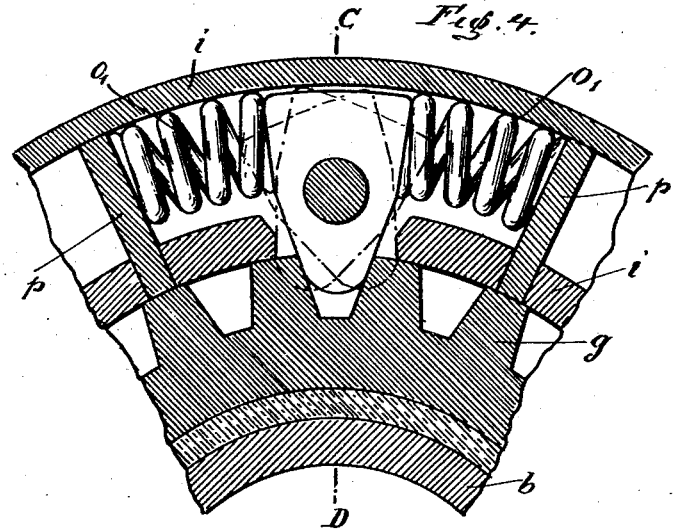
Fig. 4 is a partial cross section through E—F in Fig. 3.—

The pawl ends engaging with the teeth are so shaped as to allow of the pawls swinging about their pivots —m—, as shown in dotted lines in Fig. 4. The result is that a certain angular displacement is permitted between the sleeve —b—, ring —i— and sleeve —d—; accordingly the driven sleeve —d— and the driving sleeve —b— can be displaced relatively to one another by a certain angle, viz. by the angle corresponding to the amount by which the pawls are permitted to swing about their pivots —m—.

The pawls —n— (and —n'—), opposite to their end engaging with the teeth of rims —c— and —g— respectively, are fitted with an extension or tail portion.—

Against each side face of these tail portions bears one end of the springs —o— whose other end abuts against diaphragms —p— solidly secured to the ring —i—. The duty of the springs —o— is to counteract the swinging of the pawls —n— (and —n'—) on their pivots —m— in both directions.—

The sleeve —b—, through the toothed rim —c—, transmits its revolving motion to the pawls —n—. Due to the resistance opposed by the springs —o— to the swinging of the pawls —n— about the pivots —m—, the pawls —n— compel, yet with a certain elasticity, the ring —i— to revolve along with the sleeve —b—. In its turn the ring —i—, through the elastic intermediary of the other set of pawls —n'—, carries along with it the sleeve —d— by which the distribution is operated.—

It will therefore be seen that the drive between the shaft —a— and the driven gearwheel —f— operating the distribution takes place through two sets of resilient joint members, by which the eventual vibrations of the driving shaft are completely taken up.—

Having now particularly described and ascertained the nature of my said invention and in what manner the same is to be performed, I declare that what I claim is:

1. A device of the character described comprising a driving member, a driven member, toothed rims carried by the driving and driven members, a ring surrounding said toothed rims, pawls pivotally mounted in said ring and engaging the toothed rims, and opposed springs acting on each pawl and maintaining the latter in an intermediate balanced position.

2. A device of the character described comprising a driving member, a driven member, toothed rims carried by the driving and driven members, an annular member arranged about the toothed rims, sets of pawls coacting respectively with the driving and driven toothed rims, means pivotally mounting the pawls in the annular member, and opposed springs coacting with each pawl to maintain the latter in an intermediate balanced position.

Signed at Milan (Italy), this 22nd day of June 1923.

GIUSTINO CATTANEO.